(12) United States Patent
Sikora et al.

(10) Patent No.: US 7,395,310 B1
(45) Date of Patent: Jul. 1, 2008

(54) METHOD AND APPARATUS TO QUEUE A PLURALITY OF TRANSACTION MESSAGES

(75) Inventors: Scott E. Sikora, Seattle, WA (US); Nakul M. Lele, Mountain View, CA (US); Rajnish Tahiliani, San Jose, CA (US); Ben L. Yip, Sunnyvale, CA (US); Henry Mingkeung Yeung, Sunnyvale, CA (US); Timothy Merrell, Redmond, WA (US)

(73) Assignee: Aspect Telecommunications Corporation, San Jose, CA (US)

( * ) Notice: Subject to any disclaimer, the term of this patent is extended or adjusted under 35 U.S.C. 154(b) by 0 days.

(21) Appl. No.: 10/188,432

(22) Filed: Jul. 3, 2002

Related U.S. Application Data

(63) Continuation of application No. 09/172,182, filed on Oct. 13, 1998, now Pat. No. 6,449,646.

(51) Int. Cl.
*G06F 15/00* (2006.01)

(52) U.S. Cl. ............... 709/201; 709/220; 709/226; 709/228; 702/187; 701/86

(58) Field of Classification Search ............... 709/206, 709/204, 217, 218, 220, 222, 224, 226, 228, 709/225, 227, 201; 705/1, 14; 345/758; 370/429; 701/86; 702/187
See application file for complete search history.

(56) References Cited

U.S. PATENT DOCUMENTS

| | | | |
|---|---|---|---|
| 5,001,710 A | 3/1991 | Gawrys et al. ............. 370/58.1 |
| 5,555,179 A | 9/1996 | Koyama et al. | |
| 5,764,916 A * | 6/1998 | Busey et al. ................ 709/227 |
| 5,765,033 A | 6/1998 | Miloslavsky | |
| 5,778,178 A | 7/1998 | Arunachalam et al. ...... 709/206 |
| 5,790,800 A * | 8/1998 | Gauvin et al. ............... 709/227 |
| 5,793,365 A * | 8/1998 | Tang et al. .................. 345/758 |
| 5,793,861 A | 8/1998 | Haigh ......................... 379/266 |
| 5,825,869 A | 10/1998 | Brooks et al. ............... 379/265 |

(Continued)

OTHER PUBLICATIONS

U.S. Appl. No. 09/325,508, filed Jun. 3, 1999, Method of Queuing Requests to Access a Communications Network.

(Continued)

*Primary Examiner*—Khanh Dinh
(74) *Attorney, Agent, or Firm*—Welsh & Katz, Ltd.

(57) ABSTRACT

An apparatus for routing a transaction message, such as for example a telephone call, e-mail, web chat request, video conferencing session, or non-call event, includes a queue engine and a transaction message router. The queue engine provides an integrated mechanism for queuing transaction messages of varying transaction types within a number of queues according to transaction type. Each queue within the queue engine may be dedicated to queuing transaction messages of a specific transaction type. The transaction message router functions to identify a queue within the queue engine within which a transaction message is to be stored. The identification of a queue by the router may be performed with reference to the transaction type of a transaction message, and with reference to context or addressing information associated with a transaction message. Transaction messages of all transaction types are serviced by a single resource allocator that distributes transaction messages from the queues of the queue engine 44 to a resource, such as an agent.

44 Claims, 11 Drawing Sheets

U.S. PATENT DOCUMENTS

| | | | |
|---|---|---|---|
| 5,856,978 A * | 1/1999 | Anthias et al. | 370/429 |
| 5,884,032 A * | 3/1999 | Bateman et al. | 709/204 |
| 5,923,735 A | 7/1999 | Swartz et al. | |
| 5,926,539 A | 7/1999 | Shtivelman | |
| 5,946,387 A | 8/1999 | Miloslavsky | |
| 5,951,706 A | 9/1999 | Brenner | 714/749 |
| 5,953,332 A | 9/1999 | Miloslavsky | |
| 5,953,405 A | 9/1999 | Miloslavsky | |
| 5,956,720 A | 9/1999 | Fernandez et al. | |
| 5,960,178 A * | 9/1999 | Cochinwala et al. | 709/232 |
| 5,999,964 A | 12/1999 | Murakata et al. | 709/201 |
| 6,002,760 A | 12/1999 | Gisby | |
| 6,021,428 A | 2/2000 | Miloslavsky | |
| 6,023,510 A | 2/2000 | Epstein | 380/25 |
| 6,023,722 A * | 2/2000 | Colyer | 709/201 |
| 6,026,368 A * | 2/2000 | Brown et al. | 705/14 |
| 6,029,195 A | 2/2000 | Herz | |
| 6,044,145 A | 3/2000 | Kelly et al. | |
| 6,044,368 A | 3/2000 | Powers | |
| 6,055,567 A | 4/2000 | Ganesan et al. | |
| 6,067,357 A | 5/2000 | Kishinsky et al. | |
| 6,108,711 A | 8/2000 | Beck et al. | |
| 6,112,186 A | 8/2000 | Bergh et al. | |
| 6,167,395 A | 12/2000 | Beck et al. | |
| 6,170,011 B1 | 1/2001 | Beck et al. | |
| 6,175,563 B1 | 1/2001 | Miloslavsky | |
| 6,175,564 B1 | 1/2001 | Miloslavsky et al. | |
| 6,179,206 B1 | 1/2001 | Matsumori | |
| 6,185,292 B1 | 2/2001 | Miloslavsky | |
| 6,199,099 B1 | 3/2001 | Gershman et al. | |
| 6,202,062 B1 | 3/2001 | Cameron et al. | |
| 6,226,618 B1 * | 5/2001 | Downs et al. | 705/1 |
| 6,345,305 B1 | 2/2002 | Beck et al. | |
| 6,373,836 B1 | 4/2002 | Deryugin et al. | |
| 6,389,007 B1 | 5/2002 | Shenkman et al. | |
| 6,393,015 B1 | 5/2002 | Shtivelman | |
| 6,401,085 B1 | 6/2002 | Gershman et al. | |
| 6,424,979 B1 | 7/2002 | Livingston et al. | |
| 6,449,646 B1 * | 9/2002 | Sikora et al. | 709/226 |
| 6,501,832 B1 | 12/2002 | Saylor et al. | |
| 6,604,041 B2 * | 8/2003 | Hessmert et al. | 701/86 |
| 6,694,482 B1 | 2/2004 | Arellano et al. | |
| 6,732,156 B2 | 5/2004 | Miloslavsky | |
| 6,772,211 B2 * | 8/2004 | Lu et al. | 709/226 |
| 6,810,363 B2 * | 10/2004 | Newman et al. | 702/187 |
| 6,889,222 B1 | 5/2005 | Zhao | |
| 6,934,381 B1 * | 8/2005 | Klein et al. | 379/265.09 |
| 2002/0035568 A1 | 3/2002 | Benthin et al. | |
| 2003/0018677 A1 | 1/2003 | Mathur et al. | |
| 2003/0051037 A1 * | 3/2003 | Sundaram et al. | 709/227 |
| 2005/0135596 A1 | 6/2005 | Zhao | |
| 2007/0050382 A1 * | 3/2007 | Bugir et al. | 707/100 |

OTHER PUBLICATIONS

U.S. Appl. No. 10/660,881, filed Sep. 11, 2003, Method of Queuing Requests to Access a Communications Network.

U.S. Appl. No. 11/051,213, filed Feb. 3, 2005, Method and System for Providing Personalized Service Over Different Contact Channels.

\* cited by examiner

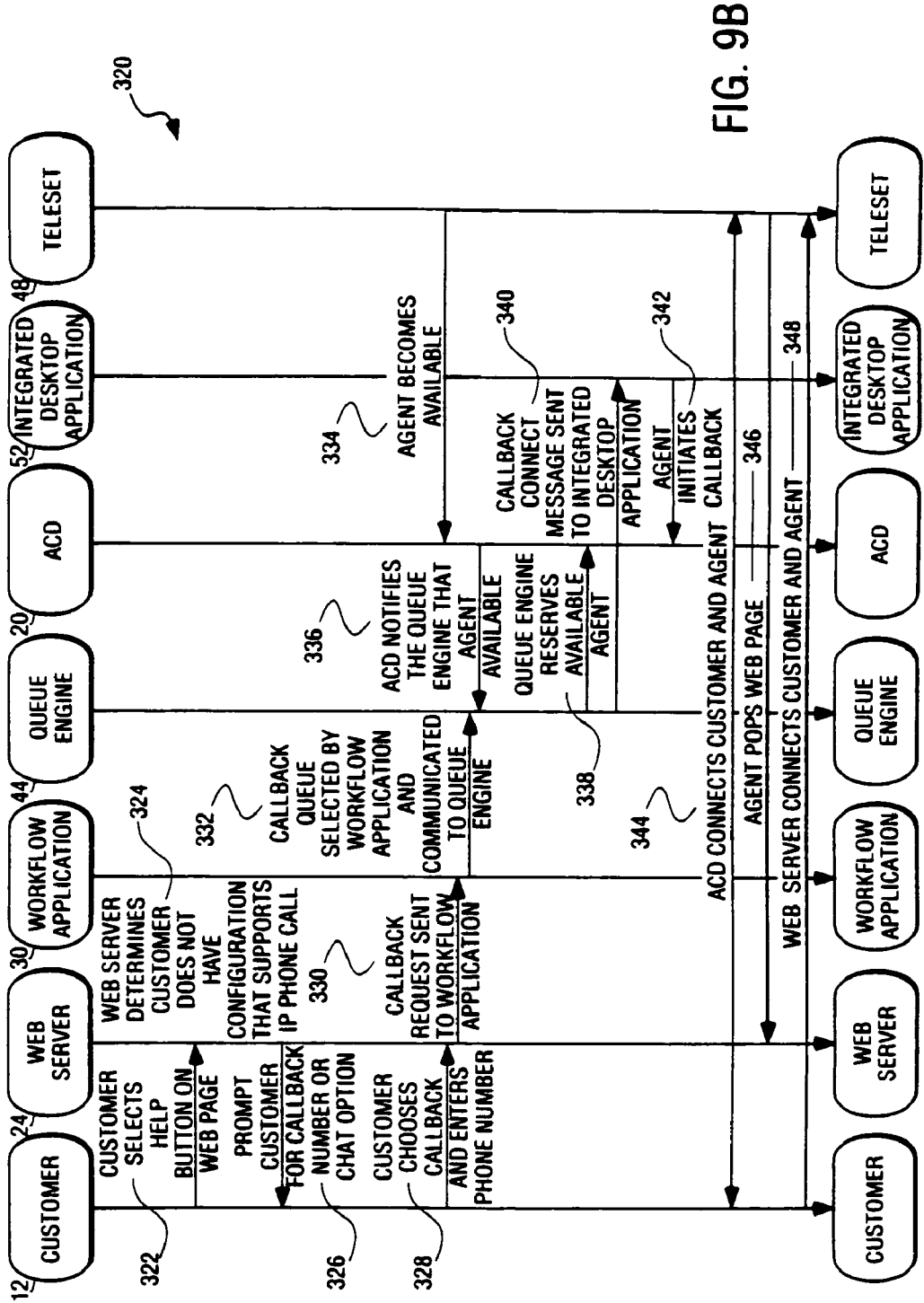

METHOD AND APPARATUS TO QUEUE A PLURALITY OF TRANSACTION MESSAGES

CROSS REFERENCE TO RELATED APPLICATION

This application is a continuation of patent application Ser. No. 09/172,182 filed Oct. 13, 1998 now U.S. Pat. No. 6,449,646.

FIELD OF THE INVENTION

The present invention relates to communications systems. More specifically, the present invention relates to the allocation of transactions conducted using a variety of media (or protocols) between a source to a resource capable of processing the transaction request.

BACKGROUND OF THE INVENTION

In order for organizations to be accessible to customers, for example to provide adequate sales and after-sales support, it is advantageous to the organization to allow a customer to communicate with a resource of the organization by any one of a number of media types or communication protocols that may be convenient for and accessible to a customer. For example, a particular customer may find it most convenient to communicate with the organization using a conventional telephone unit, whereas another custom may prefer to interact with the organization utilizing electronic mail (e-mail) or over the World Wide Web (WWW) utilizing a text chat capability. The allocation of resources to communication requests from customers received over a variety of media types may prove challenging to organizations. While traditional systems, such as Automatic Call Distributors (ACDs), may be able to handle and allocate communication requests received over one particular media type or using one particular communication protocol, such systems are typically not equipped to handle and allocate communication requests received via a further media type or communication protocol.

SUMMARY OF THE INVENTION

According to a first aspect of the present invention, there is provided a method of routing a transaction message within a communications system. First and second transaction messages of transactions of respective first and second types are queued within a queuing mechanism. Each of the first and second transaction messages are allocated from the queuing mechanism to a resource.

According to a second aspect of present invention, there is provided a further method of routing transaction messages within a communications system. Transaction messages are queued within a plurality of queues of a queuing mechanism according to a transaction type of each transaction message, each queue of the plurality of queues be dedicated to queuing transaction messages of a respective transaction type. The transaction messages are allocated from the plurality of queues of the queuing mechanism to a resource according to the availability of the resource.

According to a third aspect of the present invention, there is provided apparatus for routing a transaction message within a communications system. The routing apparatus includes a queue engine to queue transaction messages within a plurality of queues according to a transaction type of each transaction message, each queue of the plurality of queues be dedicated to queuing transaction messages of respective transaction type. A transaction message router identifies a queue within the plurality of queues within which each transaction message is queued.

According to a fourth aspect of present invention, there is provided a queue engine for queuing a plurality of transaction messages. The queue engine comprises a plurality of queues queuing transaction messages of different transaction types. Allocation logic allocates the transaction messages from the plurality of queues to a resource.

According to a fifth aspect of the present invention, there is provided a machine-readable medium storing a sequence of instructions that, when executed by a machine, cause the machine to queue transaction messages within a plurality of queues of a queuing mechanism according to a transaction type of each transaction message, each queue of the plurality of queues be dedicated to queuing transaction messages of a respective transaction type. The instructions further cause the machine to allocate the transaction messages from the plurality of queues of the queuing mechanism to a resource.

Other features of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for the purposes of illustration only, and are not intended to limit the scope of the invention.

FIG. 9B is a message diagram illustrating the routing and resource allocation of a callback transaction, according to an exemplary embodiment of the present invention, that may be performed within a transaction processing environment.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

The present invention relates to a network-based communications system whereby transactions of a number of varying types, and propagated over a number of varying media types, are allocated to resources capable of processing such transactions. While an exemplary embodiment of the present invention is described below within a transaction processing environment, it will readily be appreciated that the teachings of the present invention may be applied to any data communications environment and may be utilized within any type of data communications system.

For the purposes of the present specification, the term "transaction" shall be taken to include, but not be limited to, a telephone call, a facsimile transmission, an electronic mail (e-mail) transmission, a video session, an Internet Protocol (IP) telephone call, a text chat session, a network session or a non-call work event (e.g., case tracking). Furthermore, a transaction may be inbound (e.g., received by a transaction processing system) or outbound (e.g., transmitted from a transaction processing system).

Further, for the purposes of the present specification, the term "transaction processing system" shall be taken to include, but not be limited to, any device capable of receiving, transmitting, queuing, routing, or otherwise processing a transaction. Examples of transaction processing systems include Automatic Call Distributors (ACDs), call centers, telephone call processing devices, Private Branch Exchanges (PBXs), web servers, facsimile servers, e-mail servers, switches, routers, hubs and the like.

Architecture

Figure 1:
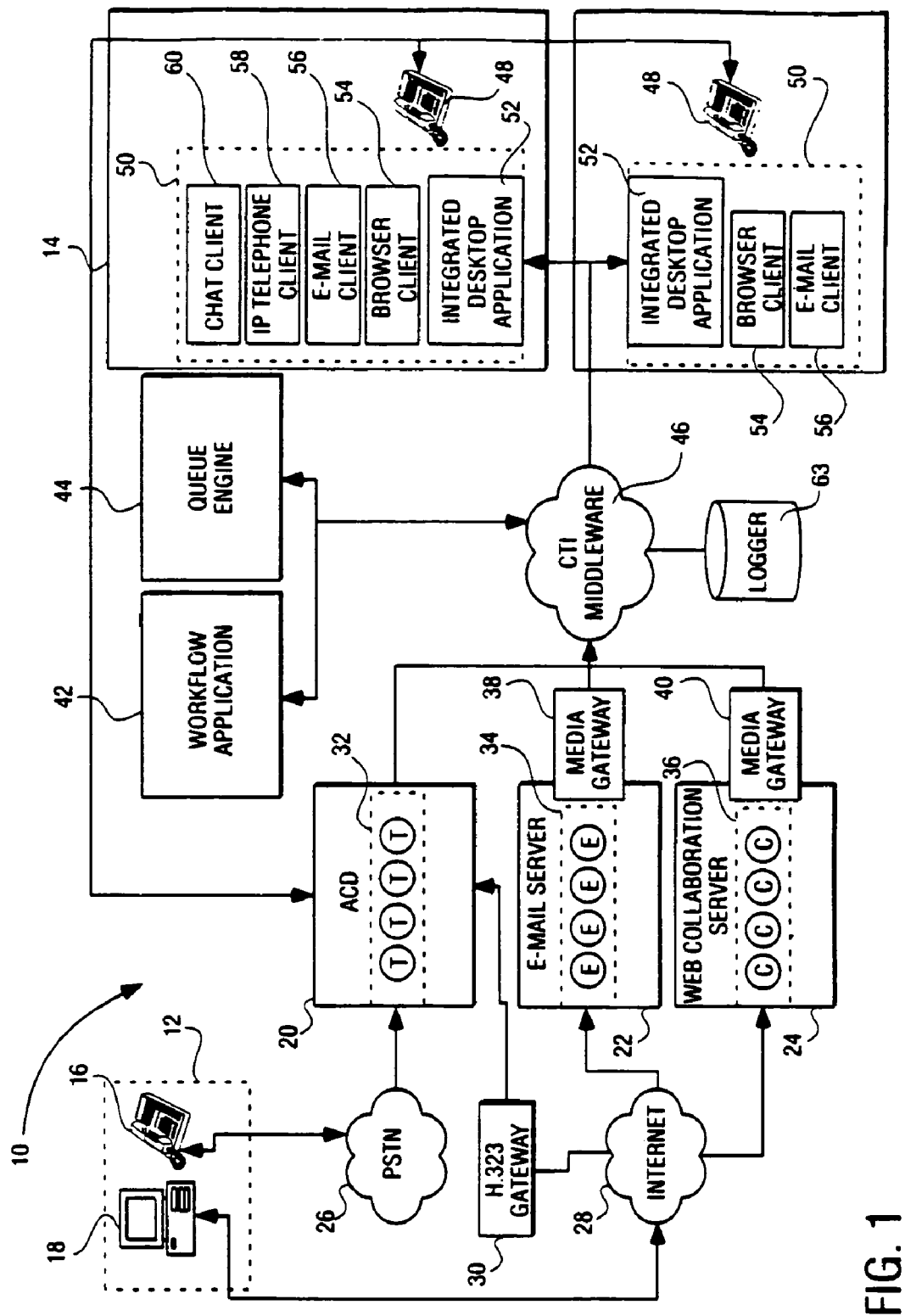
FIG. 1 is a diagrammatic representation of a transaction processing environment within which an exemplary embodiment of the present invention may be employed.

FIG. 1 is a diagrammatic representation of a transaction processing environment 10 wherein an exemplary embodiment of the present invention may be employed. The transaction processing environment 10 includes a transaction initiator 12 (e.g., a customer) and one or more resources 14 (e.g., human or automated agents) that may be capable of processing and responding to a transaction message generated by the transaction initiator 12. The transaction initiator 12 is shown to have access to a conventional telephone unit 16 and a computer system 18 via which the transaction message may be propagated to a resource 14. The computer system 18 may host any number of application programs for facilitating a transaction. Specifically, the computer system 18 may host a browser application, such as the Netscape Navigator™ developed by Netscape Communications Corporation of Mountain View, Calif. or the Internet Explorer™ developed by Microsoft Corp. of Redmond, Wash., an e-mail application, such as Outlook™ developed by Microsoft Corp., and an IP telephone application, such as NetMeeting™ developed by Microsoft Corp. Additionally, the computer system 18 may host a facsimile transmission/reception application and a telephone call application that allows a customer to send or receive a facsimile and to conduct a regular telephone call utilizing the computer system 18. The transaction initiator 12 may furthermore have access to a stand-alone fax machine or other dedicated e-mail or web devices (not shown).

Resources of an exemplary organization are shown to be accessible via three exemplary transaction processing systems, namely an Automatic Call Distributor (ACD) 20, an e-mail server 22, and a web collaboration server 24. Other transaction processing systems, for example, such as a facsimile server or a video server, are not illustrated but may be utilized within the transaction processing environment 10 in a manner similar to that described below with reference to the illustrated transaction processing systems. The telephone unit 16 of the transaction initiator 12 is shown to be coupled to the Public Switched Telephone Network (PSTN) 26 via which a transaction request (e.g., a ring voltage) from the transaction initiator 12 may be transmitted to the ACD 20. Similarly, the computer system 18 is shown to be coupled to the Internet 28, via which a transaction message (e.g., an e-mail message or a text chat request) may be propagated to either the e-mail server 22 or the web collaboration server 24. Further, a voice-over-IP gateway 30 (e.g., a H.323 gateway) is shown to couple the ACD 20 to the Internet 28, to thereby facilitate IP telephone calls between the transaction initiator 12 and a resource 14.

Each of the transaction processing systems 20, 22 and 24 may reside on a dedicated machine, or may each reside concurrently with a further transaction processing system on a shared machine. For example, the e-mail server 22 and the web collaboration server 24 may reside on a single server computer. Each of the transaction processing systems 20, 22 and 24 is furthermore shown to store transaction messages pertaining to, or containing information regarding, respective transactions. For example, the ACD 20 is shown to store a number of telephone call messages 32 (for both switched or IP telephone calls), the e-mail server 22 is shown to store a number of e-mail messages 34, and the web collaboration server 24 is shown to store a number of text chat messages 36. The transaction messages stored on each of the transaction processing systems 20-24 may be stored in queues. For example, the e-mail server 22 may store received e-mail messages in queues according to addressee information, each queue comprising a mailbox designated to a specific e-mail address. The e-mail server 22 and the web collaboration server 24 are furthermore shown to have respective media gateway applications 38 and 40 associated therewith. Each of the gateway applications 38 and 40 acts as a primary source of interaction between an associated server and downstream intelligence in the form of a workflow application 42 and a queue engine 44. The e-mail gateway application 38 may monitor a Simple Mail Transfer Protocol (SMTP) gateway for incoming e-mail and, responsive to the receipt of an e-mail message at the e-mail server 22, generate a routing message (to be described in further detail below) that is propagated to the workflow application 42. Similarly, the web gateway application 40 monitors the web collaboration server 24 for web requests, and generates a routing message that is propagated to the workflow application 42.

The workflow application 42 and the queue engine 44 are coupled to each of the transaction processing systems 20, 22, and 24 via a middleware 46, such as for example of the Prospect Computer Telephony Interface (CTI) System developed by Aspect Telecommunications, Inc. of San Jose, Calif. The media gateway applications 38 and 40 serve to couple the e-mail server 22 and the web collaboration server 24 to the middleware 46, while the ACD 20 may be coupled to the middleware 46 via dedicated software, such as the Application Bridge® software developed by Aspect Telecommunications, Inc. The middleware 46 also serves to couple each of the transaction processing systems 20-24, and both the workflow application 42 and the queue engine 44, to each of the resources 14. In the illustrated embodiment, each resource 14 comprises a human agent who has access to a telephone unit 48 and a computer system 50. The computer system 50 is shown to host an integrated desktop application 52, and a number of client programs that interact with the integrated desktop application 52. For example, the computer system 50 may host a browser client 54, an e-mail client 56, an IP telephone client 58 and a text chat client 60. The middleware 46 is also shown to be monitored by a logging application 63 that is responsible for the writing of transaction data to a local Relational Database Management System (RDBMS) (not shown). The logging application 63 is capable of monitoring and logging information regarding any one of a number of transaction types which may be initiated via the transaction processing systems 20-24 and may, for example, record information such as event type, queue time, talk time and termination time by transaction. The logging application 63 may also generate reports utilizing the record transaction information pertaining to a number of transaction types.

Figure 2:
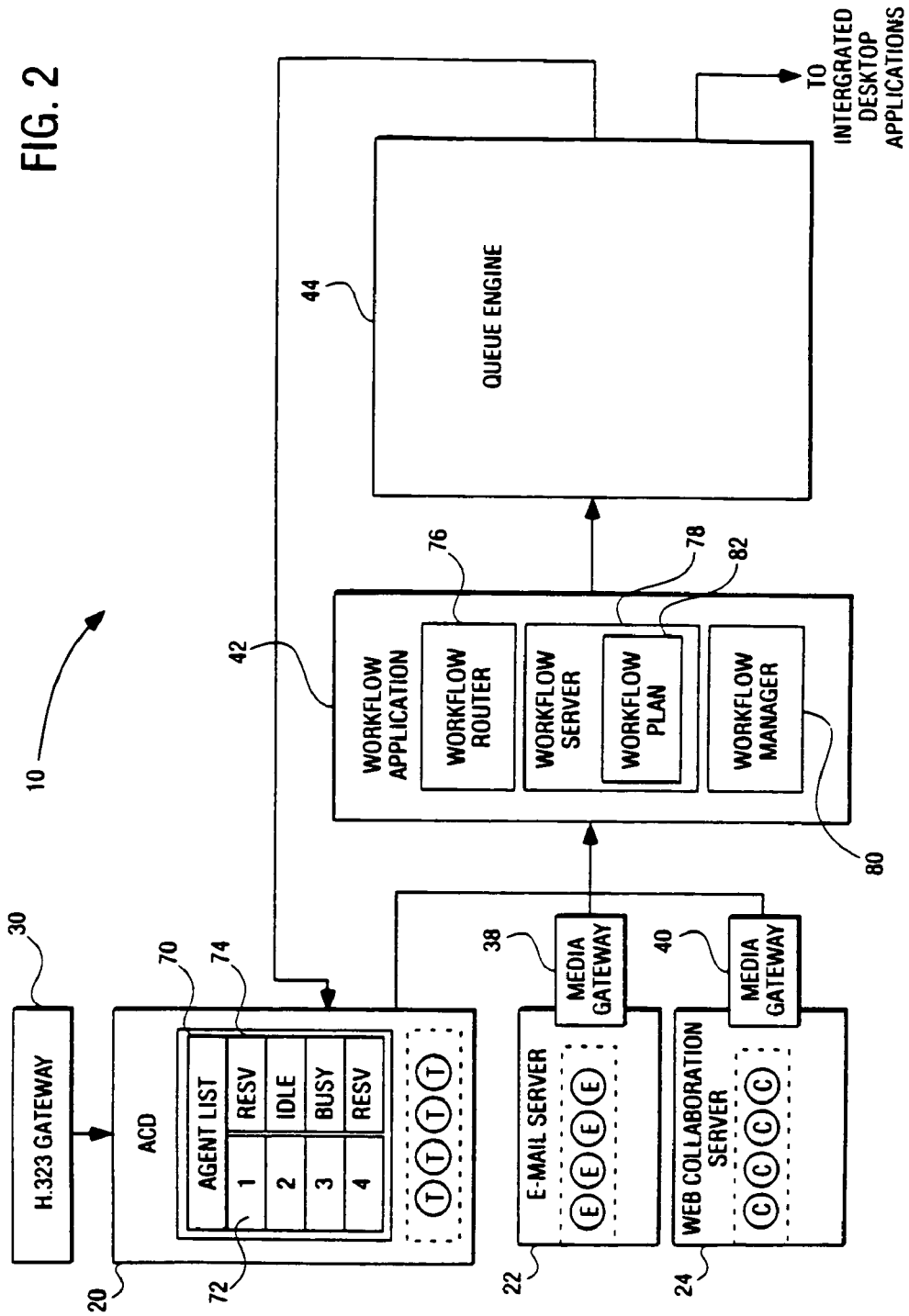
FIG. 2 is a block diagram illustrating further details regarding selected systems, according to an exemplary embodiment of the present invention, within the transaction processing environment illustrated in FIG. 1.

FIG. 2 is a block diagram illustrating further details regarding selected systems, according to one embodiment of the present invention, within the transaction processing environment 10 shown in FIG. 1. Specifically, FIG. 2 illustrates further details regarding an exemplary ACD 20, an exemplary web collaboration server 24, an exemplary workflow application 42 and an exemplary queue engine 44. The ACD 20 is shown to maintain an agent list 70 that indicates the status of each of a number of agents that may comprise resources 14. Specifically, the agent list 70 is shown to comprise the table having an identifier column 72 storing a unique identifier associated with each agent, and a status column 74 that records a status for each agent.

The web collaboration server 24 may, in one exemplary embodiment, comprise the WebAgent software application developed by Aspect Telecommunications, Inc. The server 24 functions as a central coordinator for web collaboration activity, and has the capability, via Java Applets, to determine whether a transaction initiator 12 is able to conduct an IP telephone call. The web collaboration server 24 also facilitates web page synchronization between web pages displayed on a browser client executing, for example, on the computer system 18 of the transaction initiator 12 and the browser client 54 of an agent. Specifically, the web collaboration server 24 allows joint navigation of the WWW by an agent and a transaction initiator 12, joint Hyper Text Markup Language (HTML) document viewing, and joint markup on white board areas of collaboration applications such as NetMeeting.

The web collaboration server 24 also facilitates agent scripting whereby an agent is able to "push" pages to the transaction initiator 12. Finally, the web agent collaboration server 24 facilitates CTI integration to allow agent callback on a voice phone line if so indicated by a transaction initiator 12, IP telephone call routing to an agent utilizing the voice-over-IP gateway 30 and associated synchronization of browser applications, and text chat via simple Java-based applets. For example, in the scenario where the transaction initiator 12, such as a customer, utilizes a Java-enabled browser application to access a web page of an organization, the transaction initiator 12 may select a help button on the Web page. Responsive to the selection of the help button, the web collaboration server 24 may transmit a message, in the form of a Java applet, to the customer are asking the customer what type of call would be preferable. The Java applets may prompt the customer to select between receiving a callback to a telephone via the PSTN 26, to an IP telephone application via the Internet 28 or to a text chat application via the Internet 28. In the event that the customer chooses, for example, the IP telephone application for receipt of the callback, the web collaboration server 24 downloads a Java call control applet to the computer system 18 of the customer, the call control applet initiating the IP telephone application. The call control applet furthermore initiate a call across the Internet 28 to the voice-over-IP gateway 30, and may provide the customer with call status messages as well as an interface to which the customer may drop the IP telephone call, conduct a text chat, or type data to collaborate with the agent. The voice-over-IP gateway 30 allows both switched and IP telephone calls to be delivered transparently to an agent via the ACD 20.

Figure 4:
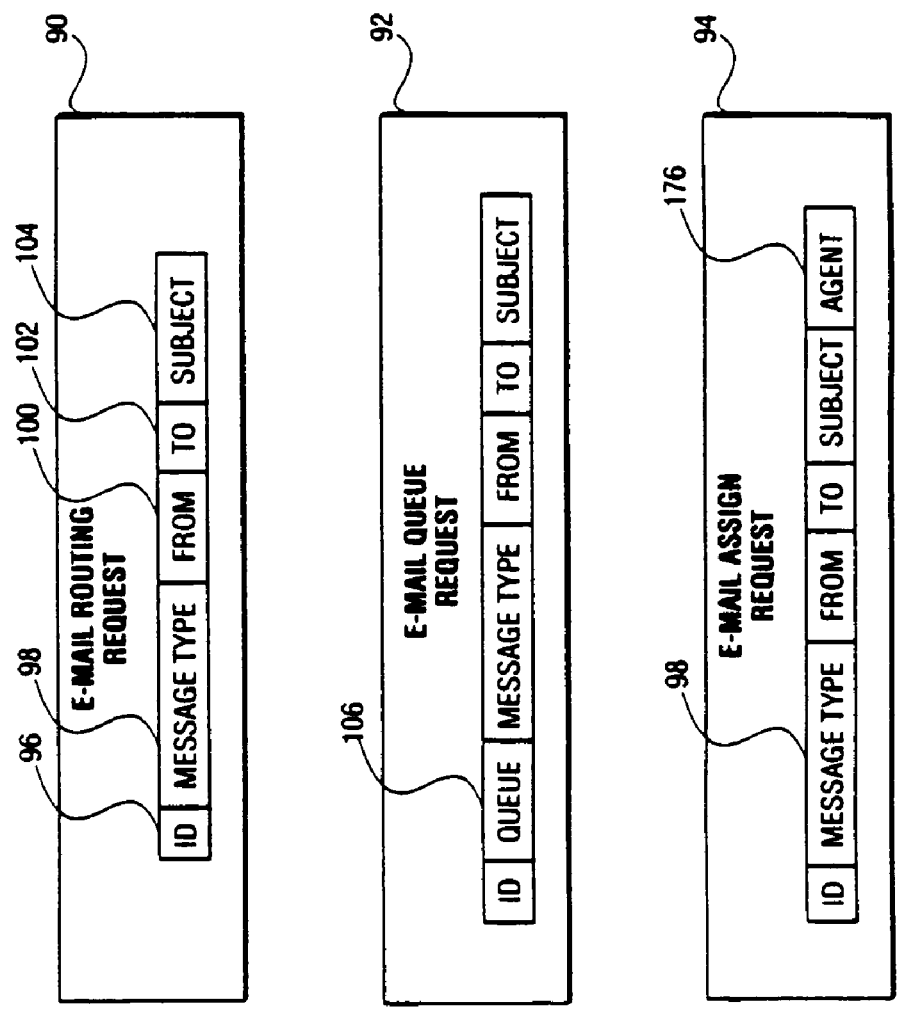
FIGS. 4 and 5 are block diagrams illustrating routing requests, queue requests and assign requests for e-mail and web chat transactions, according to exemplary embodiments of the present invention.
Figure 5:
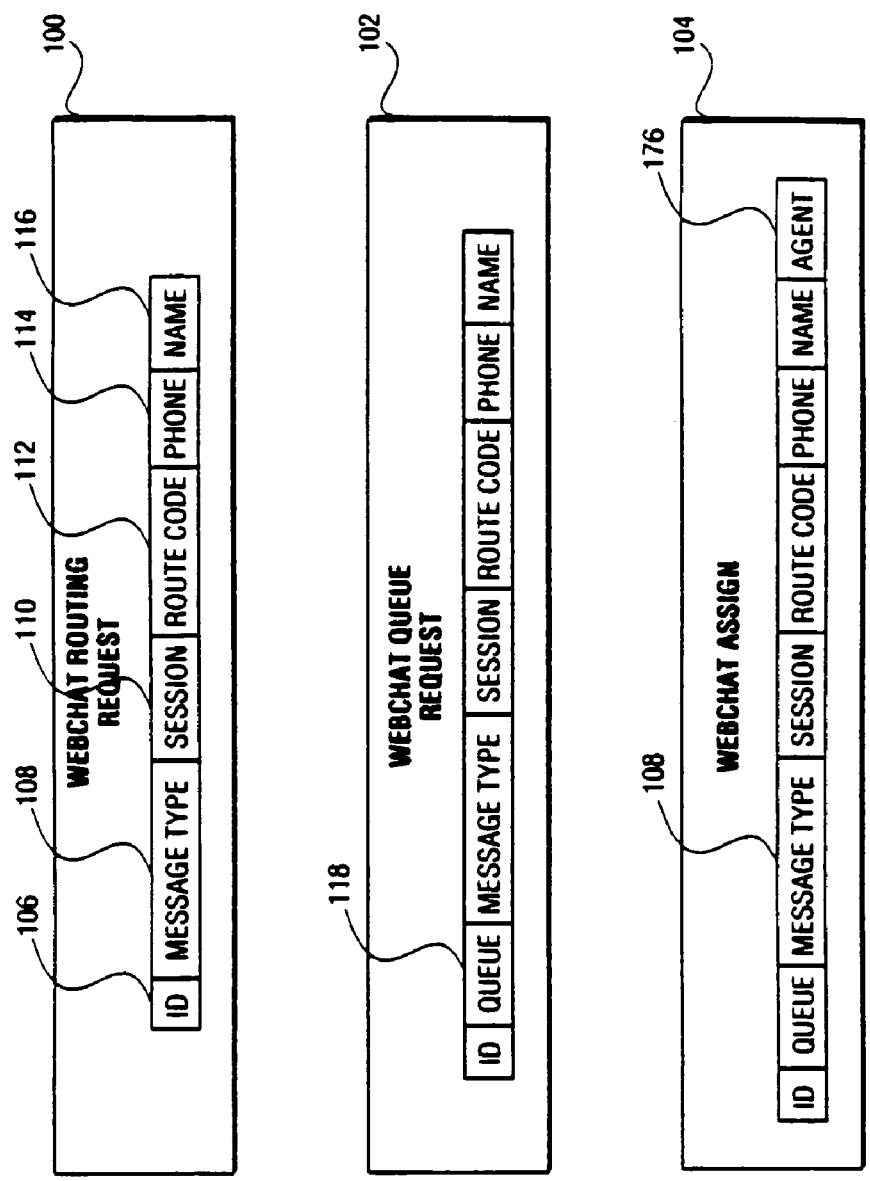

The workflow application 42 is shown to include a workflow router 76, a workflow server 78 and a workflow manager 80. The workflow server 78 furthermore embodies a set of routing rules in the form of a workflow plan 82 according to which the workflow application 42 performs a routing function. The workflow router 76 receives an event notification in the form of a "routing request" from each of the transaction processing systems 20-24 whenever an incoming transaction message (e.g., e-mail message or telephone call) is received by one of the transaction processing systems. An exemplary routing request that may be generated by the e-mail gateway application 38 is illustrated at 90 in FIG. 4. The routing request 90 comprises information extracted from an e-mail message responsive to which the routing request 90 is generated, and includes a unique identifier 96, a message type field 98 identifying the routing request 90 as an e-mail routing request, a "from" field 100 indicating an addressor of the associated e-mail message, a "to" field 102 identifying an addressee of the associated e-mail message, and a "subject" field 104 that may contain selected information extracted from the content of the associated e-mail message. FIG. 5 illustrates an exemplary "web chat" routing request 100 that may be generated by the web server gateway application 40 responsive to the receipt of a web chat request message that the web collaboration server 24. The workflow router 76 binds the received routing request to a workflow event that is communicated to the workflow server 78 via a Remote Procedure Call (RPC). The workflow server 78 then executes the workflow plan 82 to select a queue within the queue engine 44 within which the received transaction message (which may be physically stored on a transaction processing system) is to be queued. The workflow plan 82 may make the determination as to which queue a transaction message is to be routed based on a number of considerations. For example, a transaction message may be routed to a queue based on (1) the transaction type of the message (e.g., telephone call, e-mail, text chat, IP telephone call, video conference, or callback), (2) the content of the relevant transaction message (e.g., addressor, addressee, subject line or body), (3) a database lookup, or (4) the performance of any one or all of the transaction processing systems 20-24 serviced by the workflow application 42. The workflow manager 80 is an application that loads a current workflow plan 82 to the workflow server 78 in response to the receipt of a routing request at the workflow router 76. The workflow manager 80 allows for dynamic modification to the workflow plan 82 either by an automated process or by a system administrator.

Figure 3:
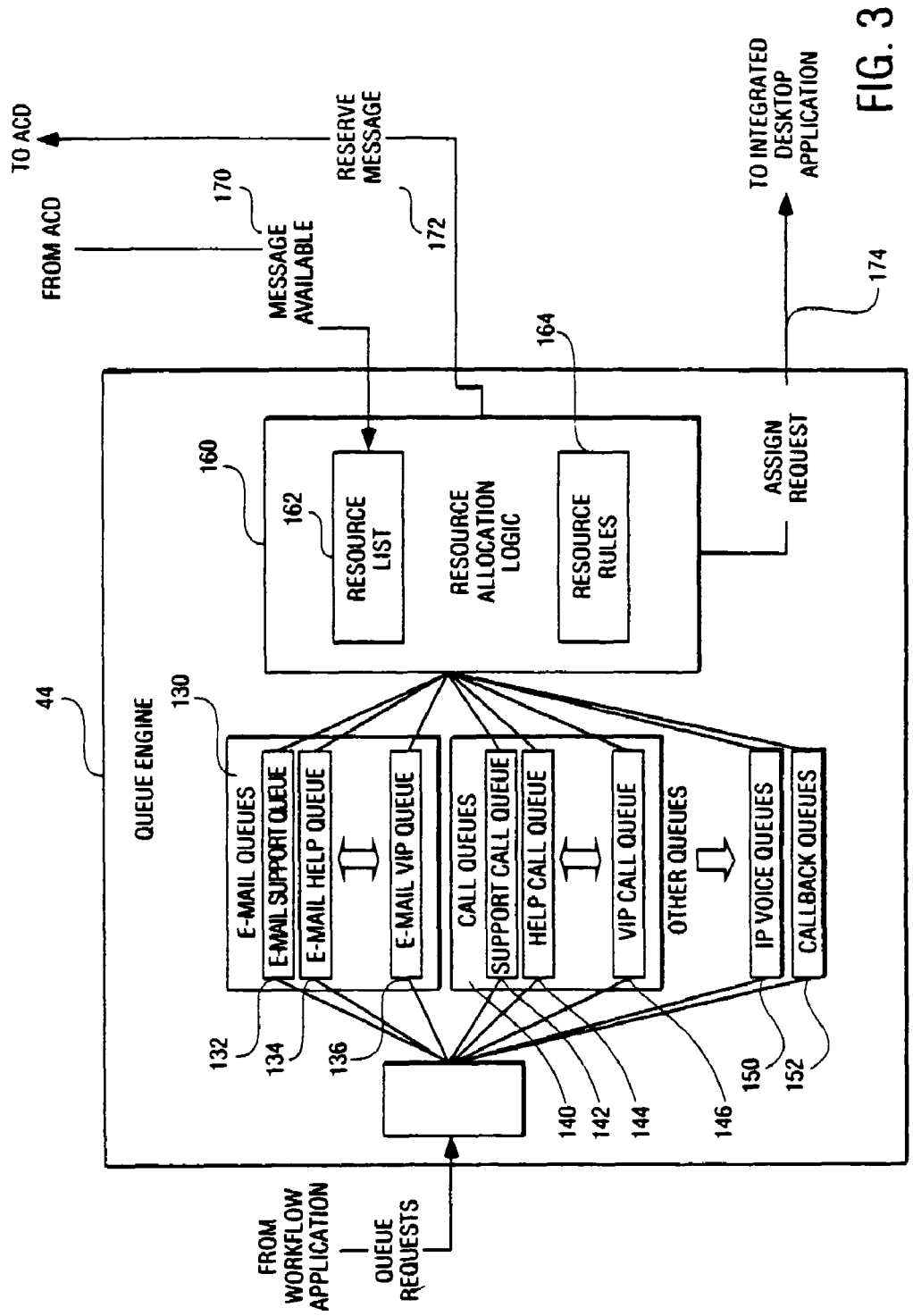
FIG. 3 is a block diagram illustrating further details regarding a queue engine, according to exemplary embodiment of the present invention.

The queue engine 44 is illustrated in further detail in FIG. 3. The queue engine 44 is responsible for the integrated queuing of transactions received at an organization over a variety of media and utilizing a variety of protocols. In one exemplary embodiment, the queue engine 44 receives event notifications in the form of "queue requests" from the workflow application 42 that are utilized to construct entries within appropriate queues maintained by the queue engine 44. FIGS. 4 and 5 illustrate exemplary queue requests 92 and 102 that may be generated by the e-mail gateway application 38 and the web gateway application 40 respectively. The queue requests include the information contained in a corresponding routing request, as well as queue indications 106 and 118, generated according to the workflow plan 82, that identifies respective queues within the queue engine 44. The queue engine 44 creates entries within an appropriate queue, responsive to the receipt of a queue request and utilizing the information contained in a received queue request. The entries within the respective queues, in one embodiment, comprise queued queue requests, and the queues are accordingly identical in field structure to the queue request constituting the queues.

Transaction messages that may be physically stored on a receiving transaction processing system 20-24 are accordingly queued by the queue engine 44, which maintains queues of entries representing the stored transaction messages. The queues maintained by the queue engine 44 may thus be regarded as "virtual" queues. The teachings of the present invention however extended to transaction processing environments in which both actual transaction messages and data representative of such transaction messages are queued. FIG. 3 illustrates a number of exemplary queues maintained within the queue engine 44. In the illustrated embodiment, the queues are constructed according to transaction type and content information (e.g., addressor and addressee information). An exemplary first group of e-mail queues 130 includes an e-mail support queue 132 that maintains entries for e-mail messages, stored on the e-mail server 22, that have been addressed to a support e-mail mailbox (e.g., support@company.com), a e-mail help queue 134 that maintains entries for e-mail messages that have been addressed to a help e-mail mailbox (e.g., help@company.com), and an e-mail VIP queue 136 that maintains entries for e-mail messages received from addressees designated as receiving preferential service or support. Similarly, a second group of call queues 140 includes a support call queue 142 that maintains entries for calls, received at the ACD 20, dialed to a support telephone number, a help call queue 144 that maintains entries for calls dialed to a help telephone number, and a VIP call queue 146 received from, for example, preferential customers. The Dialed Number Identification Service (DNIS) may identify calls from preferential customers. Any number of other groups of queues may be maintained for transactions conducted over different media, or utilizing different protocols, within the queue engine 44. Merely for example, a group of IP voice queues 150 and a group of callback queues 152 are illustrated.

The queue engine 44 is also shown to include resource allocation logic 160, which is responsible for servicing the queues maintained by the queue engine 44, and allocating entries in these queues (and accordingly the transaction messages represented by these entries) to a resource, in the exemplary form of a number of human agents. The resource allocation logic 160 is shown to include a resource list 162 that record resources that are potentially available to service entries within the queues. In one exemplary embodiment, the resource list 162 may correspond to the agent list 70 maintained on the ACD 20. The resource allocation logic 160 further includes a set of resource rules 164 that specify a number of rules according to which entries within the queues may be allocated to the agents comprising a resource. The resource rules 164 are associated with agents that comprise the resource, and evaluate to queues. For example, the resource rules 164 may specify that a certain agent only be allocated to service transaction messages of a specific type, such as for example e-mail messages or that a certain agent not be allocated to service transactions of a specific type. Further, a rule 164 may stipulate time-of-day criteria (e.g., a specific queue will only be serviced by a particular agent between specified hours) or load criteria (e.g., a specific queue will only be served by a particular agent if the depth of the queue exceeds a predetermined threshold).

The resource allocation logic 160 is furthermore shown to receive and transmit a number of messages. Firstly, the resource allocation logic is shown to receive an "available" message 170 from the ACD 20, such an "available" message 170 indicating that a particular agent on the ACD has become available as a result of, for example, completing a transaction. The "available" message 170 accordingly includes, in one exemplary embodiment, an agent identifier such as the agent identifier stored in column 72 of the agent list 70. The resource allocation logic 160 is shown to propagate a "reserve" message 172 to the ACD 20, responsive to which the ACD 20 will indicate an agent as being reserved in the agent list 70. Again, such a "reserve" message 172 includes an agent identifier that allows the ACD 20 to identify an agent within the agent list 70. Finally, the resource allocation logic 160 is shown to transmit an "assign" request 172 to the integrated desktop application 52 of an agent. Exemplary "assign" requests 172 are shown at 94 and 104 in FIGS. 4 and 5. Each of the messages 94 and 104 are shown to include a respective message type field 98 and 108, which allows an integrated desktop application 52 identify the appropriate client application to service a queued transaction. Each of the messages 94 and 108 furthermore includes an agent identifier 176. The "assign" requests 172 are communicated to the integrated desktop applications 52 from the resource allocation logic 160 via the middleware 46.

Methodology

Figure 6:
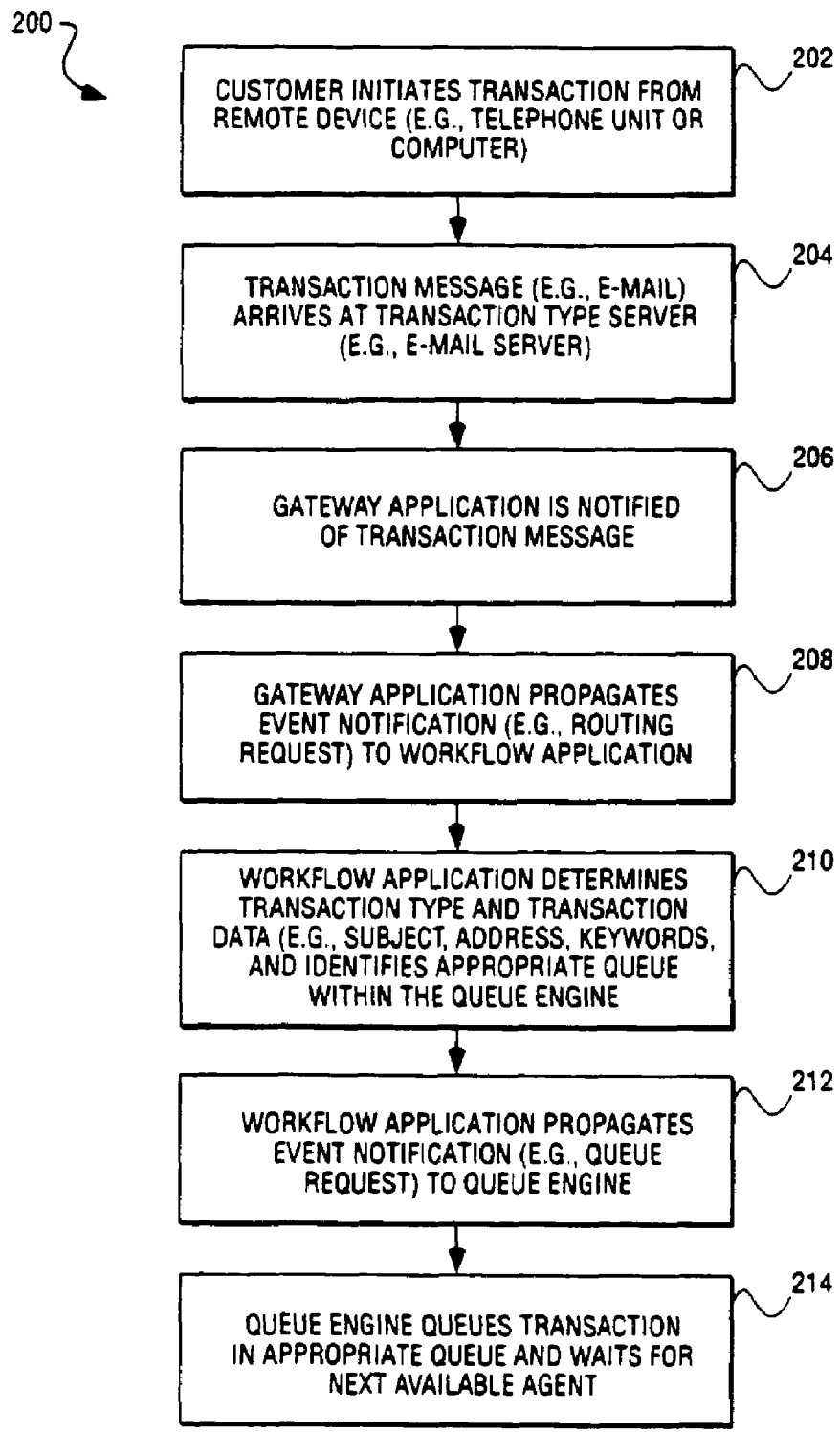
FIG. 6 is a flowchart illustrating a method, according to exemplary embodiment of the present invention, of queuing a transaction within a transaction processing environment.
Figure 7:
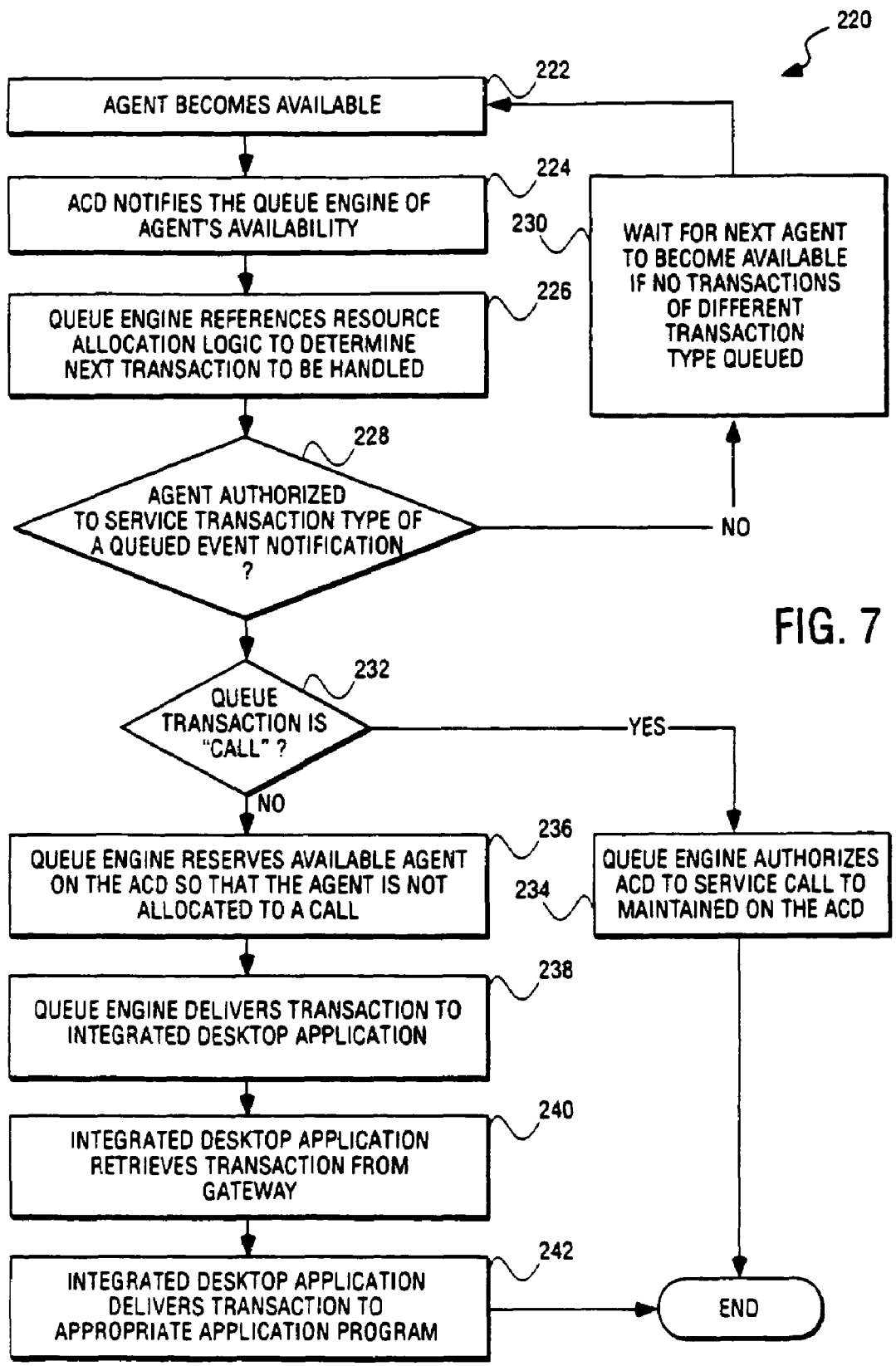
FIG. 7 is a flowchart illustrating a method, according to an exemplary embodiment of the present invention, of allocating a transaction to a resource within a transaction processing environment.

FIG. 6 is a flowchart illustrating a method 200, according to an exemplary embodiment of the present invention, of queuing a transaction within a transaction processing environment, such as for example the environment 10 shown in FIG. 1. FIG. 7 is a flowchart illustrating a method 220, according to an exemplary embodiment of the present invention, of allocating a transaction to a resource within a transaction processing environment, such as for example the environment 10 shown in FIG. 1. The methods 200 and 220 together provide an exemplary embodiment of a method of routing a transaction message within a transaction processing environment. The methods 200 and 220 are discussed below within the context of the transaction processing environment 10 illustrated in FIGS. 1-3. It will however be appreciated that the teachings of the present invention may be implemented in transaction processing environments of any construction or configuration.

The method 200 commences at step 202, where a customer initiates a transaction from a remote device. For example, utilizing the telephone unit 16, the customer may place a call to a help number provided by an organization, or using an e-mail application hosted on the computer system 18, send an e-mail to a help e-mail address advertised by an organization. At step 204, a transaction message that initiates the transaction arrives at a transaction processing system. For example, a transaction message, in the form of an application-generated or web-based e-mail, may arrive at a transaction-type specific server, in the form of the e-mail server 22. At step 206, a gateway application associated with the relevant transaction processing system is notified of the arrival of the transaction message. For example, the e-mail gateway application 38 will be notified of the arrival of an e-mail message at the e-mail server 22 directly or via the Internet 28. Upon receiving notification of the arrival of a transaction message, an appropriate gateway application will examine and parse the transaction message to extract relevant information therefrom necessary for the construction of an event notification, such as a routing request discussed above, that is then propagated from the gateway application to the workflow application 42 at step 208. Such routing request advises the workflow application 42 of the arrivals of transaction messages at any one of the transaction processing systems serviced by the workload application and the queue engine 44. At step 210, the workflow application 42 then examines the routing request to determine the transaction type of the transaction, and also to identify transaction data pertaining to the underlying transaction. For example, referring to the e-mail routing request 90 illustrated in FIG. 4, the workflow application 42 may identify the underlying transaction type as being an e-mail transaction by examining the "message type" field 98, and may identify the addressee, addressor, and subject matter of the underlying transaction by examining the content of the fields 100, 102 and 104. Having identified the transaction type and predetermined transaction data, the workflow application 42 then identifies an appropriate queue within the queue engine 44 within which the underlying transaction should be queued. Specifically, this determination is made by the workflow server 78, with reference to the workflow plan 82, as described above. Accordingly, the identification of a queue within the queue engine 44 by the workflow application 42 may be made with reference to both the transaction type of the transaction, as well as the content of a transaction message.

At step 212, the workflow application 42 transmits an event notification, for example in the form of a queue request described above, to the queue engine 44. Such a queue request identifies a queue within the queue engine 44 within which an entry for the unlike transaction should be constructed, and also includes information to be utilized for the construction of the entry. At step 214, responsive to the receipt of the queue request, the queue engine 44 queues the underlying transaction by creating an entry within the queue identified by the transaction request, and waits for an agent to become available.

The method 220 of allocating a transaction to a resource commences at step 222 when resource capacity becomes available to service the relevant transaction message. For example, the resource may become available when an agent that forms part of the resource becomes available. The availability of an agent may be detected by the ACD 20, which recognizes when an agent concludes a transaction, for example by replacing a handset into the cradle of the telephone unit 48 or by the provision of some indication via the computer system 50. At step 224, the ACD 20 then notifies the queue engine 44, via an "available" message 170, that the relevant agent has become available. At step 226, the queue engine 44 determines the next entry within the various queues maintained by the queue engine 44 that is to be serviced, and accordingly the next transaction to be handled by an agent utilizing the resource allocation logic 160. As discussed above, the resource rules 164 may be invoked in identifying the next transaction to be serviced, and in determining the suitability of the available agent to handle such an identified transaction. Specifically, a decision box 228, a determination is made as to whether the available agent is authorized to service a transaction type. For example, the resource rules 164 may stipulate that the available agent is dedicated to the servicing of a transaction type other than the next transaction selected for service. In the event that the available agent is not authorized to service the transaction, the method 220 proceeds to step 230, and waits for the next agent to become available if no further transactions are queued. On the other hand, should further transactions be queued, a determination may be made, according to the resource rules 164, whether the available agent may service any of the remaining queued transactions (step not illustrated).

If the available agent is authorized to service the next transaction, a determination is made at decision box 232 to whether the next transaction is a telephone call. If so, the queue engine 44 authorizes the ACD 20 to service the call at step 234, and removes the entry from within from the queue engine 44 (e.g., from within the support call queue 142). Conversely, should it to determine the decision box 232 that the queue transaction is not a telephone call, the queue engine 44 then reserves the available agent on the ACD 20 by transmitting a "reserve" message 172 to the ACD 20 at step 236. Responsive to the receipt of the "reserve" message 172, the ACD 20 indicates the agent status within the agent list 70 as being reserved. Accordingly, the ACD 20 is not able to allocate the agent to a telephone call on account of the agent's reserved status, and the available agent is thus able to be allocated to service a transaction queued on, for example, the e-mail server 22 or the web collaboration server 24 by the resource allocation logic 160 of the queue engine 44. At step 238, the queue engine 44 then delivers a queue transaction to a resource by, for example, propagating an "assign" request 172 as described above to an integrated desktop application 52 of the available agent. At step 240, and responsive to the receipt of the "assign" request 172, the integrated desktop application 52 of the available agent retrieves the transaction from an appropriate gateway application associated with a transaction processing system that received the original transaction message. For example, in the case of an e-mail transaction, the integrated desktop application 52 of the available agent may retrieve an e-mail message from the e-mail server 22 via the gateway application 38. At step 242, the integrated desktop application 52 delivers the transaction to an appropriate agent application program posted on, for example, a computer system 50 to which the available agent has access. For example, the e-mail message retrieved from the e-mail server 22 may be delivered to an e-mail application program running on the computer system 50. Following steps 234 or 242, the method 220 then terminates at step 244.

In the case of a queued telephone call that is selected for service according to the resource rules 164, a "reserve" message 172 is not sent to the ACD 20 nor is an "assign" request sent to the integrated desktop application 52. In this case, the "available" agent is not reserved by the resource allocation logic 160, and the ACD 20 proceeds to allocate the queued telephone call to the "available" agent in a regular manner and in accordance with logic included within the ACD 20.

Figure 8:
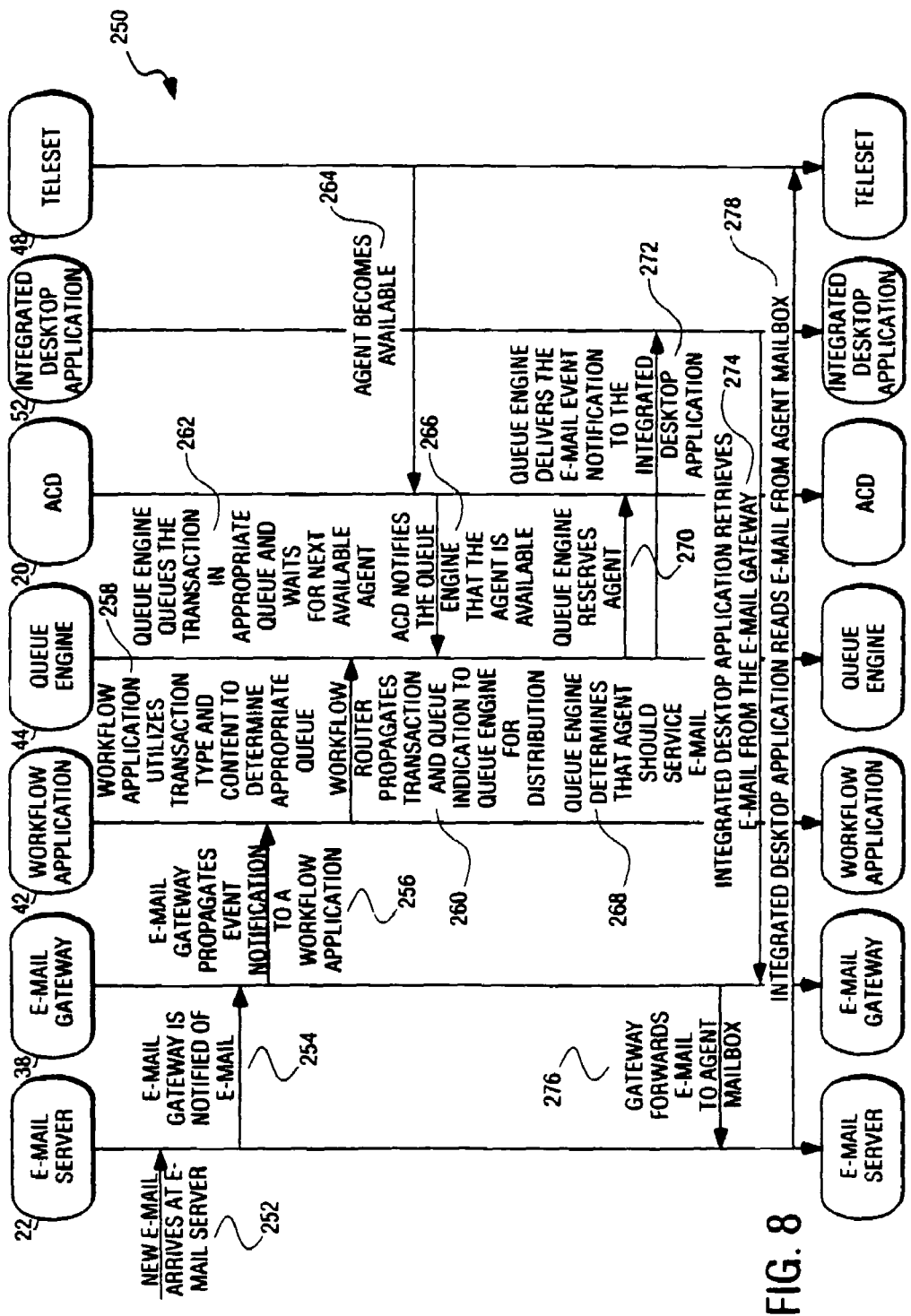
FIG. 8 is a message diagram illustrating the routing and resource allocation of an e-mail transaction, according to an exemplary embodiment of present invention, that may be performed within a transaction processing environment.

FIG. 8 is a message diagram illustrating a transaction 250, according to an exemplary embodiment of the present invention, that may be performed within the transaction processing environment 10 according to the steps of the method 200 and 220 described above. The transaction 250 is an e-mail transaction, and is performed utilizing the e-mail server 22, the gateway application 38, the workflow application 42, the queue engine 44, the ACD 20, an integrated desktop application 52 and a telephone unit 48, as illustrated in FIG. 1. At 252, a new e-mail is received at the e-mail server 22. At 254, the gateway application 38 is notified of the arrival of the e-mail. At 256, the gateway application 38 propagates an event notification (e.g., a routing request) to the workflow application 42. At 258, the workflow application 42 utilizes both transaction type and content to identify an appropriate queue within the queue engine 44 for the e-mail transaction. At 260, the workflow application 42 transmits an event notification (e.g., a queue request) to the queue engine 44, the queue request providing an identification of the relevant transaction and a queue within which to queue transaction, as well as transaction content to the queue engine 44. At 262, the queue engine queues the transaction in an appropriate queue by constructing an entry in the appropriate queue utilizing information contained in the queue request, and then waits for the next agent to become available. At step 264, agent become available, whereafter the ACD 20 notifies the queue engine 44 of the agent's availability at 266. At 268, the queue engine 44 determines whether the available agent should properly service the e-mail transaction. If the determination is positive, the queue engine 44 reserves the agent at 270 (in the case of a non-telephone/IP call). If however the next transaction for processing had been an IP or telephone call (instead of a transaction handled via the integrated desktop application 52), the queue engine 44 would not reserve the agent, and allow the ACD 20 to allocate the available agent to the next telephone or IP call. In one embodiment, the ACD 20 may operate a timer that measures a time period after an agent becomes available for receipt of a "reserve" message 172. Failing receipt of a "reserve" message 172 within the time period, the ACD 20 may assume that it may allocate the available agent to the next telephone or IP call. Thereafter, the ACD 20 may propagate a message to the queue engine 44 indicating this allocation, so that the queue engine 44 can remove the relevant entry from the appropriate call queue.

Returning to FIG. 8, at 272, the queue engine 44 then delivers an event notification (e.g., an assign request) to the integrated desktop application 52 that serves to allocate the underlying transaction to the integrated desktop application 52. At 274, the integrated desktop application 52 retrieves the e-mail message, received at the e-mail server at step 252, from the e-mail gateway application 38. At 276, the e-mail gateway application forwards the e-mail message to an agent mailbox (e.g., agent_Joe@company.com) for the agent to which the e-mail message was allocated by the assign request at 272. At 278, the integrated desktop application 52 then reads the e-mail message from the relevant agent mailbox.

Figure 9A:
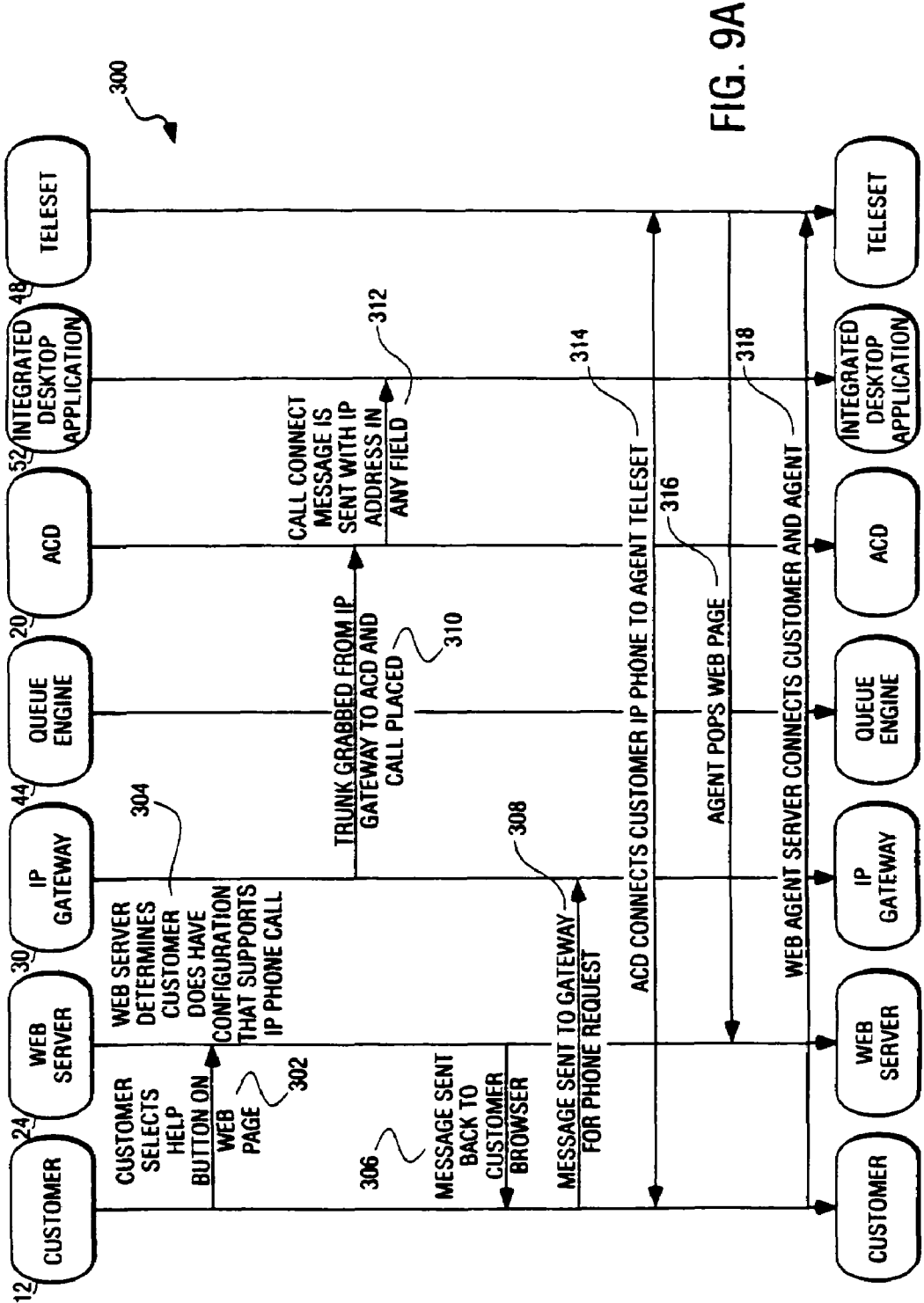
FIG. 9A is a message diagram illustrating the routing and resource allocation of an IP telephone call transaction, according to an exemplary embodiment of the present invention, that may be performed within a transaction processing environment.

FIG. 9A is a message diagram illustrating the routing and resource allocation for an IP telephone call transaction 300, according to an exemplary embodiment of the present invention, that may be performed within the transaction processing environment 10 according to the steps of the methods 200 and 220 described above. At 302, a transaction initiator in the form of a customer 12 selects a help button, merely for example, on the Web page of an organization utilizing a browser application executing on the computer system 18. Responsive to the user selection of the help button, at 304 the web collaboration server 24 determines whether or not the customer has a configuration that supports IP telephone calls. If so, at 306, the web collaboration server 24 sends a message confirming initiation of the IP telephone call to the customer browser. At 308, the customer browser sends a request message to the voice-over-IP gateway 30 requesting an IP telephone call. In an exemplary embodiment of the present invention, the IP telephone call request message conforms to the H.323 protocol. The voice-over-IP gateway 30 then grabs a trunk from the gateway 30 to the ACD 20 at 310, and a call is placed. At 312, the ACD 20 propagates a call connect message, with a unique identifier in the ANI field identifying a specific customer. At 314, the ACD 20 then connects a customer IP telephone application to the agent telephone unit 48. Step 314 may be performed responsive to an agent becoming available and the absence of the receipt of a "reserve" message 172, propagated from the queue engine 44 within a predetermined time period, at the ACD 20. It will be appreciated that a queue entry for the IP telephone call, although not shown, exists within the queue engine 44, and step 314 is performed responsive to this entry being selected for service by the resource rules 164. In an alternative embodiment of the present invention, a connection may be established between the customer IP telephone client executing on the computer system 18 and an agent IP telephone client 58 executing on the computer system 50 to which the agent has access. At 316, the agent may bring up a Web page, and at 318, the web collaboration server 24 synchronizes the Web pages viewed by the customer and the agent.

FIG. 9B is a message diagram illustrating the routing and resource allocation for a callback transaction 320, according to an exemplary embodiment of the present invention, that may be performed within the transaction processing environment according to the steps of the methods 200 and 220 described above. At step 322, a transaction initiator in the form of a customer 12 selects a help button, merely for example, on the web page of an organization. This selection of the help button may be performed by the customer 12 utilizing a browser application. Responsive to the user selection of the help button, the Web collaboration server 24, at 324, determines whether or not the customer has a configuration that supports IP telephone calls. A negative determination causes the web collaboration server 24 to select between a callback option and a web chat option. At 328, the customer 12 selects the callback option and enters a telephone number to which an agent may attempt a callback. At 330, a callback routing request, similar to the web chat routing requests 100 shown in FIG. 5, is sent to the workflow application 30. At 332, the workflow application 30, in the manner detailed above, selects an appropriate callback queue 152 in which to queue the current callback transaction. The workflow application 30 then propagates a callback queue request, similar to the web chat queue request 102 shown in FIG. 5, to the queue engine 44. The queue engine 44 then creates an entry within an appropriate callback queue 152 according to information contained in the callback queue request. At 334, an agent becomes available, whereafter the ACD 20 notifies the queue engine 44 of the agent's availability at 336. At 338, the queue engine 44 then reserves the available agent by propagating a reserve message 172 to the ACD 20. At 340, the queue engine 44 then propagates a callback connect message, similar to the web chat assign message 104 shown in FIG. 5, to the integrated desktop application 52. The callback connect message prompts an agent to initiate the callback, and provides the telephone number provided by the customer at 328. At 342, the agent initiates the callback via the ACD 20, and at 344, the ACD 20 establishes a switched telephone connection between the customer 12 and the agent. At 346, the agent may invoke a web page, whereafter the web collaboration server 24 facilitates collaboration with respect to the Web page at 348.

Computer System

Figure 10:
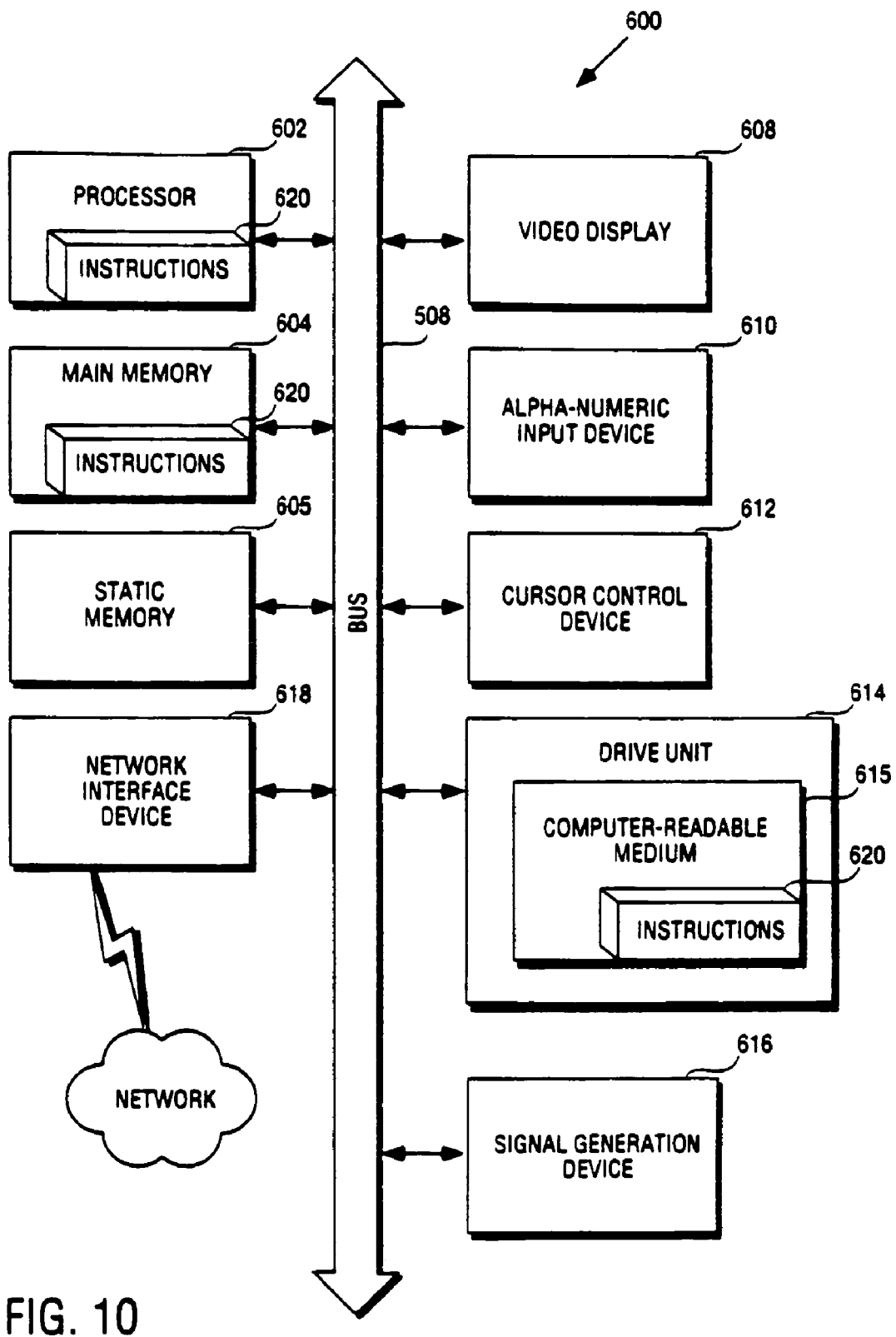
FIG. 10 is block diagram illustrating a machine, in the exemplary form of a computer system, that may execute a sequence of instructions that cause the machine to perform any one of the methodologies described in the present specification.

FIG. 10 shows a diagrammatic representation of machine in the exemplary form of a computer system 600 within which a set of instructions, for causing the machine to perform any one of the methodologies discussed above, may be executed. The computer system 600 includes a processor 602, a main memory 604 and a static memory 605, which communicate with each other via a bus 606. The computer system 600 is further shown to include a video display unit 608 (e.g., a liquid crystal display (LCD) or a cathode ray tube (CRT)). The computer system 600 also includes an alpha-numeric input device 610 (e.g. a keyboard), a cursor control device 612 (e.g. a mouse), a disk drive unit 614, a signal generation device 616 (e.g. a speaker) and a network interface device 618. The disk drive unit 614 includes a computer-readable medium 615 on which is stored a set of instructions (i.e., software) 620 embodying any one, or all, of the methodologies described above. The software 620 is also shown to reside, completely or at least partially, within the main memory 603 and/or within the processor 602. The software 620 may further be transmitted or received via the network interface device 618. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals.

Thus, a method and apparatus for allocating mixed transaction type messages to resources via an integrated queuing mechanism has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of routing multi-media transaction messages within a communications system, the method including:
   queuing queue requests representative of transaction messages within a plurality of queues of a queuing mechanism according to a transaction media type of each transaction message, and routing each queue request to one of the plurality of queues according to content of each transaction message associated with each queue request, the routing including generating a routing request associated with each transaction message upon receipt of each transaction message at a transaction processing system and forwarding the routing request to a work flow router, the transaction messages received at an organization over a plurality of types of media utilizing different protocols, each queue of the plurality of queues being dedicated to queuing queue requests representative of transaction-messages of a respective transaction media type, a first queue of the plurality of queues being dedicated to queuing queue requests representative of transaction messages of a first media type, and a second queue of the plurality of queues being dedicated to queuing queue requests representative of transaction messages of a second media type; and
   allocating the transaction messages from the plurality of queues of the queuing mechanism to a resource according to availability of the resource thereby routing the transaction messages,
   wherein the queuing of the queue requests includes generating a queue request representative of each transaction message upon receipt of each transaction message at a transaction processing system, including a transaction media type indication within the queue request, and storing each queue request, and wherein the allocating comprises allocating a queue request according to a set of rules that specify parameters for the allocation of the queue requests from any one of the plurality of queues to a plurality of agents that respectively comprise a plurality of resources.

2. The method of claim 1 wherein the set of rules specifies parameters with respect to the servicing of the plurality of queues.

3. The method of claim 1 wherein the queuing includes routing each queue request to one of the plurality of queues according to the transaction type indication within each queue request.

4. The method of claim 1 wherein the workflow router generates and issues a queue request to the queue mechanism responsive to the receipt of a routing request from the transaction processing system.

5. The method of claim 1 including providing an indication of the resource availability at the transaction processing system.

6. Apparatus for routing a transaction message, the apparatus comprising:
   a queue engine to queue requests associated with transaction messages within a plurality of queues according to a transaction media type of each transaction message wherein each queue request includes a transaction media type indication and to route each queue request to one of the plurality of queues according to content of each transaction message associated with each queue request, the routing including generating a routing request associated with each transaction message upon receipt of each transaction message at a transaction processing system and forwarding the routing request to a work flow router, each queue of the plurality of queues being dedicated to queuing queue requests representative of transaction-messages of a respective transaction media type, a first queue of the plurality of queues being dedicated to queuing queue requests representative of transaction messages of a first media type, and a second queue of the plurality of queues being dedicated to queuing queue requests representative of transaction messages of a second media type; and
   a transaction message router to identify a queue within the plurality of queues within which each queue request is to be queued and to route the transaction messages,
   wherein the queue engine allocates queue requests according to a set of rules that specify parameters for the allocation of the queue requests from any one of the plurality of queues to a plurality of agents that comprise a plurality of resources, and wherein the set of rules pertains to the plurality of agents.

7. The apparatus of claim 6 wherein the transaction message router identifies a queue within the plurality of queues according to be transaction media type of each transaction message.

8. The apparatus of claim 7 wherein the transaction message identifies a queue within the plurality of queues according to whether the transaction message is a POTS telephone call, an Internet telephone call, an e-mail message, a callback message, a text chat message, or a video conference message.

9. The apparatus of claim 6 wherein the transaction message router identifies a queue within the plurality of queues according to the content of each transaction message.

10. The apparatus of claim 9 wherein the transaction message router identifies a queue within the plurality of queues according to addressor information of the transaction message.

11. The apparatus of claim 9 wherein the transaction message router identifies a queue within the plurality of queues according to addressee information of the transaction message.

12. The apparatus of claim 6 including a transaction processing system, coupled to the transaction message router that propagates routing requests, responsive to receipt of each transaction message, to the transaction message router, each routing request being associated with a transaction message.

13. The apparatus of claim 12 wherein the transaction message router propagates the queue requests, representative of each transaction message, to the queue engine responsive to the receipt of a routing request from the transaction processing system.

14. The apparatus of claim 12 wherein the resource retrieves transaction messages from the transaction processing system responsive to a retrieve message propagated to the resource from the queue engine.

15. The apparatus of claim 6 wherein the set of rules pertains to the plurality of queues.

16. The apparatus of claim 6 wherein the queue engine allocates queue requests from the plurality of queues to a resource according to a resource availability indication provided by a transaction processing system.

17. The apparatus of claim 16 wherein the transaction processing system records the resource as being reserved responsive to an allocation of a first queue request to the resources.

18. The apparatus of claim 17 wherein the transaction processing system is an Automatic Call Distributor, and wherein the first queue request is for a transaction other than a telephone call.

19. A queue engine to queue a plurality of transaction messages, the queue engine comprising:
    a plurality of queues queuing queue requests representative of transaction messages of different transaction media types and each queue request including a transaction media type indication and each queue request routed to one of the plurality of queues according to content of each transaction message associated with each queue request, the routing including generating a routing request associated with each transaction message upon receipt of each transaction message at a transaction processing system and forwarding the routing request to a work flow router, each queue being dedicated to a respective transaction media type, a first queue of the plurality of queues being dedicated to queuing queue requests representatives of transaction messages of a first media type, and a second queue of the plurality of queues being dedicated to queuing queue requests representative of transaction messages of a second media type; and
    allocation logic to allocate the queue requests from the plurality of queues to a resource thereby routing the transaction messages,
    wherein the resource comprises first and second resource agents, and wherein the allocation logic is to allocate first and second queue requests from the plurality of queues to the first and second resource agents according to respective first and second sets of rules associated with the first and second resource agents.

20. The queue engine of claim 19 wherein each queue of the plurality of queues is dedicated to storing transaction messages of a specific content characteristic.

21. The queue engine of claim 20 wherein the specific content characteristic comprises an addressor characteristic.

22. The queue engine of claim 20 wherein the specific content characteristic comprises an addressee characteristic.

23. The queue engine of claim 19 wherein the allocation logic comprises a set of rules pertaining to the plurality of queues.

24. The queue engine of claim 19 wherein each queue request includes queue information identifying a queue of the plurality of queues, the queue information being determined by a router associated with the queue engine.

25. The queue engine of claim 19 wherein each queue request includes content information indicative of content of the associated transaction message.

26. A machine-readable tangible storage medium storing a sequence of instructions that, when executed by a machine, cause the machine to:
    queue requests representative of transaction messages, each request including a transaction media type indication, within a plurality of queues of a queuing mechanism according to a transaction media type of each transaction message, and route each request to one of the plurality of queues according to content of each transaction message associated with each request, the routing including generating a routing request associated with each transaction message upon receipt of each transaction message at a transaction processing system and forwarding the routing request to a work flow router, each queue of the plurality of queues being dedicated to queuing requests representative of transaction messages of a respective transaction media type, a first queue of the plurality of queues being dedicated to queuing queue requests representative of transaction messages of a first media type and a second queue of the plurality of queues being dedicated to queuing queue requests representative of transaction messages of a second media type; and
    allocate the requests from the plurality of queues of the queuing mechanism to a resource,
    wherein the resource comprises first and second resource agents, and wherein the allocating includes allocating first and second queue requests from the queuing mechanism to the first and second resource agents according to respective first and second sets of rules associated with the first and second resource agents thereby routing the transaction messages.

27. A method of routing a transaction message, the method including:
    queuing first and second queue requests representative of first and second transaction messages of respective first and second media types within a queuing mechanism and wherein each queue request includes a transaction media type indication within the queue request; and
    allocating each of the first and second queue requests from the queuing mechanism to a resource,
    wherein the queuing includes issuing the first queue request, representative of the first transaction message, from a routing mechanism to a first queue of a plurality of queues maintained within the queuing mechanism, the first queue being identified by the routing mechanism according to content of the transaction message associated with the first queue request to store the queue request and being dedicated to queuing queue requests representative of transaction messages of a first media type, the routing mechanism generating a routing request associated with each transaction message upon receipt of each transaction message at a transaction processing system and forwarding the routing request to a work flow router and wherein the allocating includes allocating the queue request, representative of the first transaction message, from the first queue to a first agent of a plurality of agents comprising the resource according to rules associated with the plurality of agents thereby routing the transaction messages.

28. The method of claim 27 wherein the queuing includes generating the first queue request, representative of the first transaction message, upon receipt of the first transaction processing system, generating a second queue request, representative of the second transaction message, upon receipt of the second transaction message at a second transaction processing system, and queuing the first and second queue requests within the queue mechanism.

29. The method of claim 27 wherein the queuing includes storing the first transaction message at the first transaction processing system, and storing the second transaction message at the second transaction processing system.

30. The method of claim 29 wherein the allocating of the first transaction message to the resource comprises retrieving the first transaction message from the first transaction processing system upon allocation of the first queue request to the resource.

31. The method of claim 27 wherein the allocating includes allocating each of the first and second transaction messages to the resource according to availability of the resource.

32. The method of claim 31 including maintaining an indication of the availability of the resource at a first location distinct from the queuing mechanism.

33. The method of claim 32 wherein the first location comprises an Automatic Call Distributor that is distinct from the queuing mechanism.

34. The method of claim 27 wherein the allocating of the first transaction message to the resource comprises issuing the first transaction message from the first transaction processing system to the resource upon allocation of the first queue request to the resource.

35. The method of claim 27 wherein the queuing mechanism includes first and second queues to queue transaction messages for transactions of the first and second types, and wherein the queuing comprises routing the first transaction message to the first queue and routing the second transaction message to the second queue.

36. The method of claim 35 wherein the queuing comprises routing the first and second transaction messages according to the first and second transaction types.

37. The method of claim 35 wherein the queuing comprises routing the first and second transaction messages according to transaction message content.

38. The method of claim 37 wherein the queuing comprises routing the first and second transaction messages according to source information identifying the respective sources of the first and second transaction messages.

39. The method of claim 37 wherein the queuing comprises routing the first and second transaction messages according to destination information identifying respective destinations for the first and second transaction messages.

40. The method of claim 27 wherein the resource comprises first and second resource agents, and wherein the allocating includes allocating the first and second transaction messages from the queuing mechanism to the first and second resource agents according to respective first and second sets of rules associated with the first and second resource agents.

41. The method of claim 27 wherein the queuing includes receiving the first transaction message at a first transaction processing system, issuing a routing request, representative of the first transaction message, from the first transaction processing system to a routing mechanism responsive to the receipt of the first transaction message at the first server.

42. The method of claim 27 wherein the allocating includes retrieving the first transaction message from the first transaction processing system responsive to the allocation of the queue request to the first agent.

43. The method of claim 27 wherein the allocating includes propagating the first transaction message from the first transaction processing system to the first agent responsive to the allocation of the queue request to the first agent.

44. The method of claim 27 wherein the allocating includes allocating the queue request, representative of the first transaction message, from the first queue to the first agent of a plurality of agents upon the first agent becoming available, the availability of the first agent being recorded at either one of the first or second transaction processing system.

* * * * *